US00RE38359E

(19) United States
(12) Reissued Patent
Olshansky

(10) Patent Number: US RE38,359 E
(45) Date of Reissued Patent: Dec. 23, 2003

(54) OPTICAL SIGNAL EQUALIZER FOR WAVELENGTH DIVISION MULTIPLEXED OPTICAL FIBER SYSTEMS

(75) Inventor: Robert Olshansky, Wayland, MA (US)

(73) Assignee: Verizon Laboratories Inc., Waltham, MA (US)

(21) Appl. No.: 10/045,869

(22) Filed: Oct. 29, 2001

Related U.S. Patent Documents

Reissue of:
(64) Patent No.: 5,276,543
Issued: Jan. 4, 1994
Appl. No.: 07/079,165
Filed: Nov. 22, 1991

(51) Int. Cl.[7] ..... H04J 14/02; H04B 10/00; H04B 10/12; G02E 1/335; G02B 6/28

(52) U.S. Cl. ..... 359/124; 359/127; 359/161; 359/173; 385/7; 385/24; 385/27

(58) Field of Search ..... 359/124, 127, 359/161, 173, 176, 188, 195; 385/7, 24, 27

(56) References Cited

U.S. PATENT DOCUMENTS 4,693,547 A * 9/1987 Soref et al. ..... 350/96.13
5,002,349 A * 3/1991 Cheung et al. ..... 350/96.13
5,007,693 A * 4/1991 Yamazaki et al. ..... 350/96.13
5,050,954 A * 9/1991 Gardner et al. ..... 385/16
5,060,310 A * 10/1991 Frisch et al. ..... 359/188
5,144,467 A * 9/1992 Kitajima et al. ..... 359/124

OTHER PUBLICATIONS

IEEE Journal on Selected Areas in Communications vol. 8 No. 6 Aug. 1990 Cheung p. 1015 Acoustic Tunable Filters in narrowband WDM networks System Issues and Network Applications.*
OFC'91 Alferness et al. p. 143 InGaAsP/InP Buried Rib Waveguide Vertical Coupler Filter p. 144 Feb. 21, 1991.*
OFC'91 Wu et al. Ultra Narrow Bandwidth InP/InGaAsp Directional coupler Filter p. 144 Feb. 21, 1991.*
OFC'91 Zamkotsian et al. Efficient 45° Polarization Converter on (110) InP p. 145 Feb. 21, 1991.*
OFC'91 Smith et al. Waveguiding Devices p. 142 Feb. 21, 1991.*
IEEE Journal on Selected Areas in Communications vol. 8 No. 6 Aug. 1990 p. 1151 Smith et al. Integrated–Optic Accoustical Tunable Filters for WDM Networks.*

* cited by examiner

*Primary Examiner*—Jason Chan
*Assistant Examiner*—M. R. Sedighjan
(74) *Attorney, Agent, or Firm*—Leonard Charles Suchyta; James K. Weixel

(57) ABSTRACT

This invention disclosure describes the application of a polarization insensitive acoustically-tuned optical filter used in a multichannel WDM system to equalize variations in the power level of the WDM channels. The invention also describes a simple means for providing a low frequency control system which enables the equalizer to determine the signal levels of N optical carriers prior to equalizing the signals.

7 Claims, 3 Drawing Sheets

OPTICAL SIGNAL EQUALIZER FOR WAVELENGTH DIVISION MULTIPLEXED OPTICAL FIBER SYSTEMS

Matter enclosed in heavy brackets [ ] appears in the original patent but forms no part of this reissue specification; matter printed in italics indicates the additions made by reissue.

FIELD OF THE INVENTION

The present invention relates to equalization of wavelength-dependent optical signals, and more particularly to equalization of wavelength-dependent optical signals using a polarization-independent acoustically tuned optical filter.

BACKGROUND OF THE INVENTION

It is known that long optical fiber transmission links for telecommunications can be built using cascaded chains of optical amplifiers. Erbium doped optical fiber amplifiers are particularly well-suited for implementing these long distance transmission systems due to their excellent performance characteristics and ease of fabrication.

However, multiplexed optical-signals utilizing wavelength division multiplexed (WDM) systems and erbium doped optical amplifiers exhibit a variation in signal gain that is a function of the individual wave-lengths. Moreover, utilizing cascaded optical amplifiers to compensate for attenuation over the transmission link only exaggerates the variation in signal gain for the separate wavelengths. For example, a 10 channel WDM system with a 1 nm channel spacing could easily having a gain variation over the 10 nm signal band of from 1 to 3 dB after amplification. The total gain variation is increased by the product of the number of cascaded amplifiers, and thus will certainly be much larger. While a 1 to 3 dB gain variation may be acceptable for short amplifiers chains, with 10 or more cascaded amplifiers the resulting 10 to 10 dB gain variation is not likely to be acceptable.

Large variation in component signal levels of a multiplexed signal over the wavelength spectrum complicates the design and performance of optical receivers and -detectors, and thus it is advantageous to equalize variations in signal level for any wavelength-dependent elements in the optical transmission path, particularly wavelength-dependent gain due to amplification.

OBJECTS OF THE INVENTION

Accordingly it is a primary object of this invention to obviate the above noted and other disadvantages of the prior art.

It is a further object of this invention to control the optical signal level of a optical signal composed of a plurality of differing wavelengths.

It is a yet further object of this invention to provide for uniform wavelength amplification of an optical signal composed of a plurality of differing wavelengths.

It is a still further object of this invention to provide for automatic adjustment of an optical signal composed of multiple wavelengths.

SUMMARY OF THE INVENTION

The above and other objects and advantages are achieved in one aspect of the invention by including a polarization-independent acoustically tuned optical filter (PIATOF) after a set of cascaded optical amplifiers to produce a uniform signal level for each associated wavelength of the input optical signal.

Multiple optical signals at differing wavelengths are combined by a wavelength division multiplexor and passed through a series of optical amplifiers. The output signal from the cascaded amplifiers is input to a PIATOF. A PIATOF is a two port output device, and the output of port one of he PIATOF is tapped and the tapped signal is supplied to a demultiplexer to separate the input signal according to wavelength. The resultant output signals of the, demultiplexer are input to a control circuitry. The control circuitry compares the output signal levels of the PIATOF for each wavelength and determines a proper RF power signal to be input at the control electrode of the PIATOF so that the signal level for each wavelength of the output signal at port one of the PIATOF is uniform after the amplification.

DETAILED DESCRIPTION OF THE PREFERRED EMBODIMENT

Figure 1:
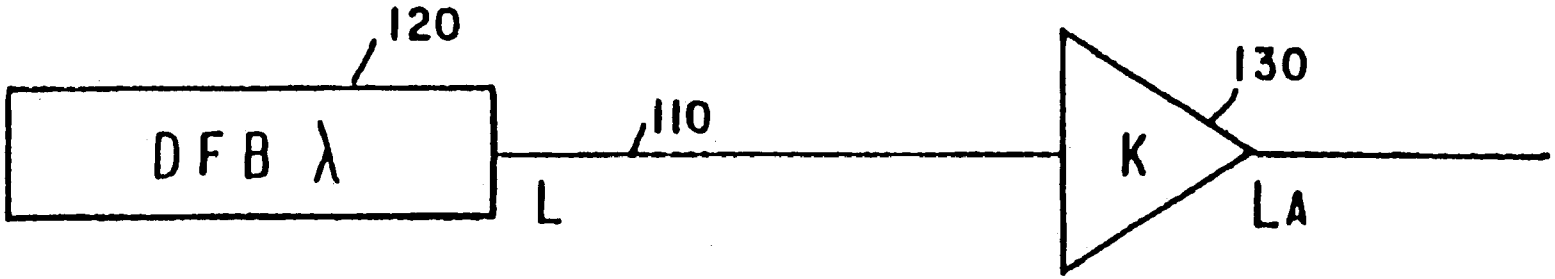
FIG. 1 is an illustration of a fiber optic communication link including a DFB laser and an optical amplifier.

Referring now to FIG. 1, wherein is depicted an optical fiber 110 coupled to a lightwave source 120 such as a DFB laser with optical intensity L at wavelength X. Optical Fiber 110 is coupled to an optical amplifier 130, resulting in an optical gain and an output optical intensity of $L_A$. The gain, $K=L_A/L$, of optical amplifier 130 is a function of the wavelength $\lambda$ of the input lightwave. Thus if multiple wavelengths are combined in an input lightwave source and amplified, the gain for each wavelength after amplification will not be uniform, but rather dependent on the input wavelength.

Figure 2:
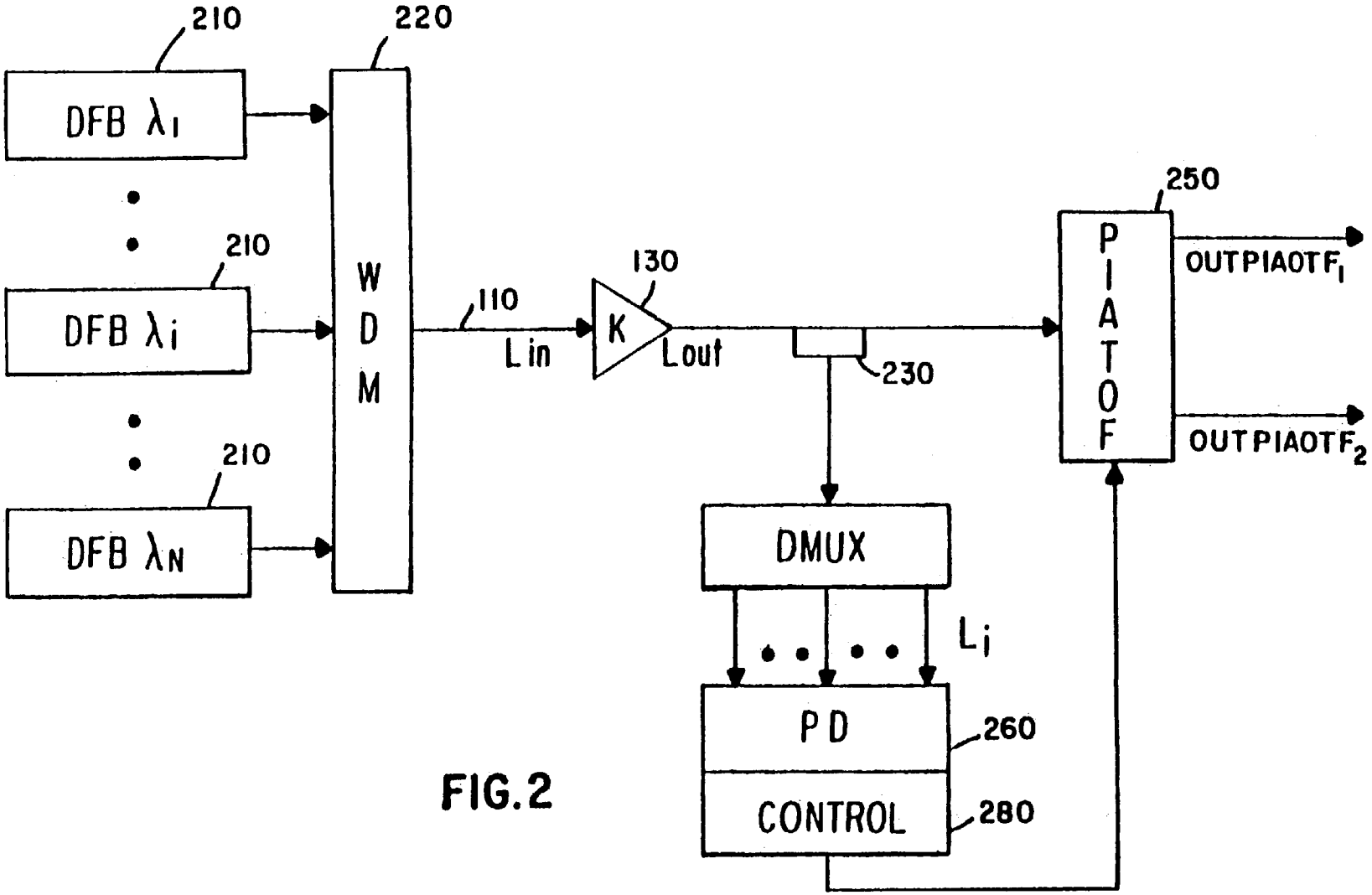
FIG. 2 is an illustration of a fiber optic communication system in accordance with the instant invention and including multiple light sources emitting different wavelengths with a polarization independent acoustically-tuned optical filter for equalizing the output signal of an amplifier.

Referring now to FIG. 2, wherein one embodiment of the instant invention is depicted. N lightwave sources 210 transmit separate lightwave with wavelengths $\lambda_i$. i=1, . . . ,n, which are input to a wavelength division multiplexor 220 (WDM). The signals are combined in WDM 220 and transmitted on fiber optic cable 110 to optical amplifier 130. The optical input signal to amplifier 130 is designated as $L_{in}$, and as stated above is the combination of the individual lightwaves at wavelengths $\lambda_i$. After amplification by amplifier 130, the resultant optical signal $L_{out}$, which is the sum of the individual amplified lightwaves at wavelengths $\lambda_i$ does not exemplify a uniform optical signal at the individual wavelengths. The output signal $L_{out}$ is tapped at tap 230 and a portion of $L_{out}$ is input into a 1×N demultiplexer 240 to isolate each separate lightwave at wavelength $\lambda_i$. The intensity of the optical signal from the output of the demultiplexer is designated as $L_i$ for each wavelength $\lambda_i$. The untapped optical signal is input into a polarization independent acoustically-tuned optical filter 250 (PIATOF) which functions as a multi-channel splitter and equalizer. Polarization independent acoustically-tuned optical filters using wavelength division multiplexing are described by D. A. Smith et al. in "Integrated-optic Acoustically Tunable Filters for WDm Networks" IEEE JSAC, Vol. 8 pgs. 1151–1159, 1990, and D. A. Smith et al. in "Integrated-optic Acoustically Tunable Filters: Devices and Applications", Optical Fiber Conference (OFC'91), San Diego, Feb. 18–22, 1991, p. 142, both of which are incorporated by reference into this application.

PIATOF 250 has one input port, two output ports, and a control electrode for determining the distribution of the input optical signal between the two ports. For the N WDM ($\lambda_1, \lambda_2, \ldots \lambda_n$) wavelengths of $L_{out}$ which are input to the PIATOF 250, each of the signals can be directed to either of the two output ports by applying an RF signal at frequency$_i$ to the control electrode of the PIATOF. The frequency $f_i$ is the corresponding frequency for wavelength $\lambda_i$. After applying RF power $P_i$ at frequency $f_i$, all the optical signal on channel i at wavelength $\lambda$ appears at port 2 of the PIATOF. Power $P_i$ is determined emperically as it depends on construction of the PIATOF. Applying RF power $X_iP_i$ at frequency $f_i$, the optical signal levels corresponding to an initial lightwave intensity $L_i$ appear at the respective ports of the PIATOF.

$$\text{OUTPIATOF}_1=L_i\cos^2(\sqrt{X_i}\pi/2)$$

$$\text{OUTPIATOF}_2=L_i\sin^2(\sqrt{X_i}\pi/2)$$

Accordingly the optical signal level appearing at port 1 can be independently controlled by applying a specified set of RF power levels determined by a set of parameters ($X_1 \ldots X_n$) at frequencies $f_i$ corresponding to the wavelengths $\lambda_i$.

Continuing to refer to FIG. 2, PIATOF 250 is used as a means for equalizing the power levels of the optical signals resulting from amplifier 130. After signal $L_{out}$ is demultiplexed into the signals $L_i$, each signal $L_i$ is input to a bank of n photodetectors 260 to determine the signal levels of the $L_i$ and is input to Control System 280 to compare the respective levels. Control System 280 determines the coefficients $X_i$ for the respective wavelengths $\lambda_i$ so as to equalize the output signal from PIATOF 250. RF power $X_iP_i$ at frequency $f_i$ for each i=1, . . . , n is combined an input to the PIATOF on the control port of the device. The resultant output of the PIATOF displays a uniform signal for each wavelength $\lambda_i$.

Figure 3:
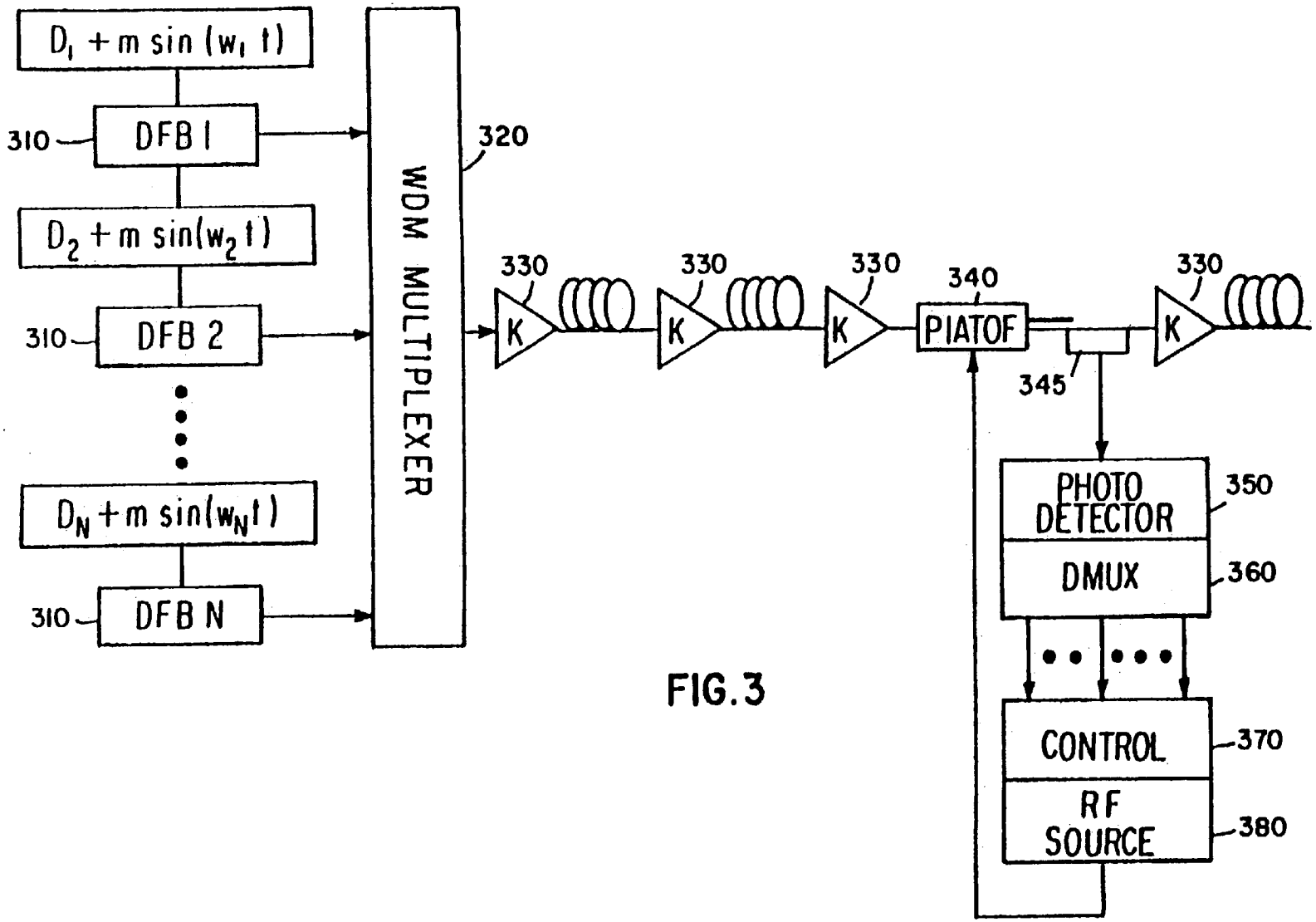
FIG. 3 illustrates another embodiment of the invention wherein a plurality of digital signals are combined with a low frequency reference carrier, amplified, and input to a polarization independent acoustically-tuned optical filter which equalizes the signal level of the individual signals.

A further embodiment of the instant invention is shown in FIG. 3. Multiple transmitting DFB lasers 310 carrying conventional digital data ($D_1, \ldots, D_N$) are modulated by low frequency control signals ($\omega_i$=1 k to 10 k) with a small modulation depth from m=0.01 to 0.05. Each transmitting laser 310 is modulated by a separate control frequency ($\omega_1, \ldots, \omega_N$). After combining the modulated input signals at WDM multiplexor 320, the combined signal is passed through a series of fiber amplifier 330. After the cascaded amplifiers 330, a PIATOF 340 is installed in the transmission path. A 10 dB optical tap 345 is installed on output one of the PIATOF, and the tapped optical signal is provided to a single photodiode at photodetector 350. Photodetector 350 converts the tapped optical signal to an electrical signal, and demodulation circuit 360 demultiplexes the signal into the signals $C_i$ at the input frequencies $\omega_i$. Each signal $C_i$ is input to Control System 370 to compare the respective levels. Control System 370 determines the coefficients $X_i$ for the respective frequencies $\omega_i$ so as to equalize the output signal from the PIATOF 340. Applying RF power $X_iP_i$ at RF source 390 at frequency $\omega_i$ for each i=1, . . . ,n, the signals are combined and input to the PIATOF at the control port one of the PIATOF is attenuated by the factor $\cos^2(\sqrt{X_i}\pi/2)$. By adjusting the coefficient $X_i$ for frequency $\omega_i$ for frequency $\omega_i$ of the RF power at the control port, the output signal is equalized. Control circuitry 370 continuously monitors the modulated signal at the frequencies ($\omega_i, \ldots, \omega_N$) providing dynamic equalization of gain/loss due to elements in the network.

While there has been shown and described what is at present considered the preferred embodiment of the invention it will be obvious to those skilled in the art that various changes and modifications may be made therein without departing from the spirit and scope of the invention as defined by the appended claims.

What is claimed is:

1. Apparatus in a communication system for controlling the level of a multiplexed optical signal composed of a plurality of amplified optical signals [Si] $S_i$ where i is a number denoting one of the plurality of optical signals at an individual [frequency fi] *wavelength* $\lambda_i$ comprising:

tap means for tapping said multiplexed optical signal to produce a tapped multiplexed optical signal;

means for converting said tapped multiplexed optical signal to demultiplexed electrical signals;

control means having an input port for receiving said demultiplexed electrical signals, including a calculation means for calculating coefficients [Xi at frequency fi] $X_i$ corresponding to individual wavelengths $\lambda_i$;

filter means having an input port for receiving said input multiplexed optical signal, a first output port for transmitting a first output optical signal, and including a control port means for receiving said control signal;

wherein the filter means responsive to the control signal attenuates the level of one or more of the individual optical signals [S] $S_i$ at the first output port according to the relation [$\cos^2(\sqrt{X}i\pi/2)$] $cos^2(\sqrt{X_i}\pi/2)$.

2. The apparatus of claim 1 wherein the filter means is a polarization independent acoustically tuned optical filter.

3. The apparatus of claim 1 wherein the control signal of the control port means in a multiplexed signal composed of one or more [of the] frequencies corresponding to the wavelengths of the individual optical signals.

4. The apparatus of claim 1 wherein the control signal of the control port means is an electrical signal.

5. The apparatus of claim 1 wherein the control port means for receiving a control signal is an optical signal.

6. The apparatus of claim 1 further comprising:

a second output port for transmitting a second output signal;

wherein the filter means distributes the input optical signal between the first output port and the second output port.

7. The apparatus of claim 6 wherein the filter means distributes the input optical signal composed of a plurality of optical signals at separate wavelengths at the second output port proportional to [$\sin^2(\sqrt{X}i\pi/2)$] $sin^2(\sqrt{X_i}\pi/2)$.

* * * * *